United States Patent
Hagersten et al.

(10) Patent No.: US 10,884,925 B2
(45) Date of Patent: Jan. 5, 2021

(54) SYSTEMS AND METHODS FOR TAG-LESS BUFFER IMPLEMENTATION

(71) Applicant: Samsung Electronics Co., Ltd., Suwon-si, Gyeonggi-do (KR)

(72) Inventors: Erik Ernst Hagersten, Uppsala (SE); Andreas Karl Sembrant, Uppsala (SE)

(73) Assignee: SAMSUNG ELECTRONICS CO., LTD., Gyeonggi-do (KR)

(*) Notice: Subject to any disclaimer, the term of this patent is extended or adjusted under 35 U.S.C. 154(b) by 72 days.

(21) Appl. No.: 16/196,065

(22) Filed: Nov. 20, 2018

(65) Prior Publication Data

US 2019/0155732 A1     May 23, 2019

Related U.S. Application Data

(60) Provisional application No. 62/588,712, filed on Nov. 20, 2017.

(51) Int. Cl.
| | |
|---|---|
| *G06F 12/08* | (2016.01) |
| *G06F 12/12* | (2016.01) |
| *G06F 12/0806* | (2016.01) |
| *G06F 12/128* | (2016.01) |
| *G06F 12/0811* | (2016.01) |
| *G06F 12/0895* | (2016.01) |

(52) U.S. Cl.
CPC ...... *G06F 12/0806* (2013.01); *G06F 12/0811* (2013.01); *G06F 12/0895* (2013.01); *G06F 12/128* (2013.01); *G06F 2212/6042* (2013.01); *G06F 2212/6046* (2013.01)

(58) Field of Classification Search
CPC ....... G06F 12/08; G06F 12/12; G06F 2212/60

USPC .......................................... 711/122
See application file for complete search history.

(56) References Cited

U.S. PATENT DOCUMENTS

| | | | | |
|---|---|---|---|---|
| 5,829,038 | A * | 10/1998 | Merrell | G06F 12/0811 711/143 |
| 2011/0161589 | A1* | 6/2011 | Guthrie | G06F 12/0811 711/122 |
| 2014/0129744 | A1* | 5/2014 | Muppirala | G06F 13/1642 710/39 |

(Continued)

FOREIGN PATENT DOCUMENTS

KR        10-1064178 B1     9/2011

OTHER PUBLICATIONS

European Search Report for European Patent Application No. 18207302.3 dated Mar. 25, 2019.

(Continued)

*Primary Examiner* — Christopher B Shin
(74) *Attorney, Agent, or Firm* — Harness, Dickey & Pierce, P.L.C.

(57) ABSTRACT

A data management method for a computer system including at least one processor and at least a first cache, a second cache, a victim buffer (VB), and a memory allocated to the at least one processor, includes selecting a victim cache line to be evicted from the first cache; finding a VB location corresponding to the victim cache line from a set of the VB; copying data of the victim cache line to a data field of the VB location; copying a backward pointer (BP) associated with the victim cache line to a BP field of the VB location; and reclaiming victim space of the first cache using the VB.

20 Claims, 8 Drawing Sheets

(56) References Cited

U.S. PATENT DOCUMENTS

| | | | |
|---|---|---|---|
| 2015/0143047 A1* | 5/2015 | Hagersten | G06F 12/0897 |
| | | | 711/122 |
| 2015/0347297 A1 | 12/2015 | Hagersten et al. | |
| 2015/0347302 A1* | 12/2015 | Hagersten | G06F 12/0888 |
| | | | 711/122 |
| 2018/0322053 A1* | 11/2018 | Hagersten | G06F 12/0811 |
| 2019/0042439 A1* | 2/2019 | Drerup | G06F 12/0815 |

OTHER PUBLICATIONS

Office Action for corresponding Korean Patent Application No. KR 10-2018-0143907 dated Apr. 10, 2020.

* cited by examiner

SYSTEMS AND METHODS FOR TAG-LESS BUFFER IMPLEMENTATION

CROSS-REFERENCE TO RELATED APPLICATION

This application claims priority under 35 U.S.C. § 119 to U.S. Provisional Application No. 62/588,712, filed on Nov. 20, 2017, in the U.S. Patent and Trademark Office, the disclosure of which is incorporated herein in its entirety by reference.

BACKGROUND

1. Field

At least some example embodiments of the inventive concepts relate, generally, to methods and systems for accessing data in computer memory devices and, more particularly, mechanisms and techniques for implementing tag-less buffers.

2. Description of Related Art

Today's processors are often equipped with caches that can store copies of the data and instructions stored in some high-capacity memory. A popular example today of such high-capacity memory is dynamic random access memory (DRAM). Herein, the term "memory" will be used to collectively refer to all existing and future memory implementations. Cache memories, or "caches" for short, are typically built from much smaller and much faster memory than other memory implementations and can subsequently only hold copies of a fraction of the data stored in main memories or secondary storage devices at any given time. Today, caches are often implemented using SRAM and large caches can be implemented using DRAM. The caches described herein can be implemented using any existing and future memory technology.

Often, the memory system of a computer system includes a range of caches, with larger and slower caches (here referred to as higher-level caches) close to the main memory and smaller and faster caches (here referred to as lower-level caches) closer to the processor. This configuration is typically referred to as a cache hierarchy, memory hierarchy or memory system. Each level in the cache hierarchy is referred to as a cache level. FIG. 1 is a block diagram illustrating a portion of a computer system. In the example illustrated in FIG. 1, the computer system is a multi-processor system, where each CPU 101 is assigned its own first-level private cache 102 (L1 cache). More detailed examples of the CPU 101 and the L1 cache 102 are described below with reference to FIG. 2. A private cache is a cache where space for a data unit can only be in response to an activity of a CPU local to the cache (or a CPU in the same node as the cache, where the cache is private to that node). In this example, the second-level cache 103 is shared by all the CPUs 101 and may contain data and instructions that are accessed by all of the CPUs 101. Cache 103 is a global cache, since space for a data unit can be made in response to activities of any CPU 101. Furthermore, cache 103 is a shared cache, since each data unit can only exist in one shared copy (while each private cache can have its own replicated copy). Memory 105 also stores instructions and data that are accessed by all CPUs 101. The (main) memory 105 is typically accessed using a physical address, or PA for short, while the addresses generated by a CPU 101 are typically virtual addresses.

Computer systems with several CPUs and several private caches, such as the system shown in FIG. 1, need efficient mechanisms for finding a requested data unit in one of the caches as well as for keeping the multiple copies of a datum stored in different nodes coherent.

Such computer systems will also typically include one or more secondary storage devices in addition to main memory and cache memory. These secondary storage devices can include one or more of hard drives, optical drives, flash drives or the like, which are collectively represented here by disk 104. The disk or secondary storage 104 may store several orders of magnitude more data than the memory 105, but is not directly accessible using a physical address. If a CPU 101 wants to access data stored on the disk 104, a virtual memory system (not shown in FIG. 1) moves a chunk of data, typically referred to as a page, from the disk 104 to the memory 105 and creates a translation from virtual addresses corresponding to that page to physical addresses. A special kind of translation cache (not shown in FIG. 1), typically called a "translation look-aside buffer" or TLB for short, caches the translation mappings from virtual pages to physical pages. The virtual memory system can be viewed as a caching system, which stores a portion of the data located in the disk 104 in the memory 105.

FIG. 2 is a block diagram for explaining an example cache hierarchy of a computer system. FIG. 2 shows a more detailed view of the cache organization from FIG. 1, where the CPU 101 is shown to contain several cache-like structures, such as the Instruction TLB (ITLB, 201) and Data TLB (DTLDB, 205), and a CPU core 202. The level 1 cache 102 is shown as including an instruction cache 200 and a data cache 206, interposed between the CPU 101 and the level 2 (and potentially higher level) caches 207. FIG. 2 also shows a high-capacity memory 208 connected to the cache hierarchy. Though, the computer system in FIG. 2 is illustrated as a uni-processor (i.e., one-processor) system.

When a CPU 101 requests data that is present in the cache, referred to as a cache hit, that request can be serviced much faster than an access to data that is not present in the cache, referred to as a cache miss. Typically, an application running on the CPU 101 that experiences fewer cache misses will execute more quickly and consume less energy than if the same application which suffers from more cache misses, assuming that the two versions of the application otherwise have similar properties. Therefore, considerable effort has been invested in techniques for avoiding cache misses, and also to design implementations that can make cache hits and cache misses efficient with respect to both their access latency and the energy that these memory transactions consume.

In order to understand how to develop solutions to this cache hit/miss problem, some understanding of cache organization and terminology will be useful. Typically, data are installed into caches in fixed chunks that are larger than the word size of a processor, known as cache lines. Common cache line sizes today are, for example, 32, 64 and 128 bytes, but as will be appreciated by those skilled in the art both larger and smaller cache line sizes exist for various cache implementations. The cache line size may also be variable for some cache implementations.

A common way to organize the data placement in memory 208 is in a manner that each data word is statically mapped to reside in one specific cache line. Each cache typically has an index function that identifies a portion of the cache where each cache line can reside, known as a set. The set may contain space to hold one or more cache lines at the same time. The number of cache lines which the set can hold is referred to as its associativity. Often, the associativity for all of the sets in a cache is the same. Such caches are often referred to as set-associative caches. The associativity may also vary between the sets. Each of the spaces in a set that can hold a cache line is referred to as a way.

In order to determine the identity of each cache line stored in each set, cache lines in a cache each have some identifier associated with them. One common example of such an identifier is an address tag. When looking for a specific cache line in a cache, its address may be used to determine the set of the cache where it may reside. The address tags of the cache lines of the corresponding set are compared to a tag portion of the address used to identify a cache line (see, e.g., TAG and ATAG depicted in FIG. 3 and described below) to determine if the desired cache line resides in the cache, and if so, in which way it resides, i.e., in which of the spaces in a set that can hold a cache line it resides. Typically, the size of such ADDR address tags is fairly large and can be in the range 30-40 bits, which is 6-10% the size of a typical cache line.

Often, each cache has built-in strategies to determine which cache line to keep in the set and which cache line to evict (also referred to as replace) to make space for a new cache line being brought into the set, referred to as its replacement policy. The replaced cache line is known as a victim or a replaced cache line. Popular replacement policies used in conjunction with cache memories include, but are not limited to, least-recently used (LRU), pseudo-LRU and random replacement policies.

Inclusive cache hierarchies require that a copy of a block of data (for example a cache line) present in one cache level, for example a block of data in the L1 cache, also exists in the higher cache levels (here, higher refers to cache levels with higher numbers than 1), for example in the L2 and L3 cache. Exclusive cache hierarchies only have one copy of the block of data (for example a cache line) existing in the entire cache hierarchy, while non-inclusive hierarchies can have a mixture of both strategies. In exclusive and non-inclusive cache hierarchies, it is common that a cache line is installed in the next higher cache level upon eviction from a given cache level.

With this background on caches and cache lines in mind, this discussion now proceeds to illustrate one conventional technique for identifying specific cache locations within a cache hierarchy like that shown in FIGS. 1 and 2. FIG. 3 is a block diagram for explaining a conventional implementation of a two-level cache hierarchy including a set-associative caches and a set-associative data translation look-aside buffer (TLB). FIG. 3 shows an example of the organization of a computer system node containing a CPU 301, a DTLB 303, an L1 CACHE 307 and an L2 CACHE 311. The CPU 301 generates a memory request containing a virtual address 302 (VADDR), which is used to perform an associative lookup in the DTLB 303. The virtual address 302 is in this example divided into three parts: P-OFFSET (page offset, for example consisting of the low-level bits), TAG and INDEX. The INDEX portion of the virtual address 302 is used to identify the set within the DTLB 303 where the address translation may be stored.

The illustrated DTLB 303 used in this example has a two-way associative organization, showing two entries of the identified set. Each entry consists of an address tag (ATAG) 304, and physical page frame (PPF) 305. The TAG portion of the virtual address 302 is compared with the ATAGs 304 of each entry of the identified set. The logic 318 determines if there is match for any of the entries, and, if so, controls the MUX 306 to select the corresponding PPF 305.

A physical address PADDR 316 is composed by concatenating the PPF 305 selected by MUX 306 with the P-OFFSET portion of the virtual address 302. Alternatively, if neither of the entries of the identified set match the TAG portion of the virtual address 302, then a TLB fill operation is performed and the needed translation entry is brought into the DTLB 303.

The PADDR 316 is used to perform a lookup in the L1 CACHE 307. More specifically, an INDEX portion of the PADDR 316 is used to identify the set where the cache line containing the requested data may be stored. (It should be noted that this L1 INDEX may contain different bits than the DTLB INDEX). The depicted L1 CACHE 307 has a 2-way associative organization with two entries in the identified set. Each entry consists of an address tag (ATAG) 308, and data 309 of the corresponding cache line. A TAG portion of the PADDR 316 is compared with the ATAGs of each entry of the identified set. The logic 319 determines if there is match for any of the entries, and controls the MUX 310 to select the corresponding data. If neither of the entries matches (depicted by L1 MISS 317) a lookup in the L2 CACHE 311 is needed. While the division of PADDR 316 into INDEX and TAG portions for the L2 CACHE lookup may differ from the division done for the L1 CACHE lookup, the remaining steps for the L2 CACHE lookup are typically similar to those performed for the lookup in the L1 CACHE. If a miss in the L2 CACHE is determined, new lookups in higher-level caches or accesses to memory may be needed. It can be noted that if the INDEX portion of PADDR 316 used by the L1 cache is entirely composed by P_OFFSET bits, the access to the L1 cache 307 can be started before the PPF information coming from the MUX 306 is available. This is often referred to as a virtually indexed, physically tagged cache (VIPT).

It would be appreciated by someone skilled in the art that several "nodes", each with a memory hierarchy similar to the one depicted in FIG. 3, can be connected together to form a coherent multiprocessor system. Another example of a multiprocessor is shown in FIG. 1, where each CPU has its own private L1 cache. This further complicates the task of locating where a requested data resides since it is no longer sufficient to always search for the data in the next higher cache level. Mechanisms for searching caches of the other nodes as well as for keeping the multiple copies of a datum stored in different nodes coherent are needed.

As further background information, FIG. 4 is a block diagram illustrating an example implementation of a tag-less cache. Such caches rely on location information (LI), which is sometimes referred to as cache line pointers CP, corresponding to a requested cache line of a matching cache table entry (CTE) (sometimes referred to as a region location) to indicate in which cache, as well as in which location within that cache, the requested cache line resides. This will cause computer systems to perform a direct cache lookup at the appropriate cache. The example implementation of the tag-less cache illustrated in FIG. 4 includes a two-level cache hierarchy and a two-level cache location buffer (CLB) hierarchy, where the first level is virtually accessed and the second level is physically accessed For example, in the system (which may be a node in a multiprocessor system) shown in FIG. 4, the location information can distinguish between L1 CACHE and L2 CACHE. It may also be able to distinguish between other caches present in the rest of the multiprocessor system, not shown in this Figure. FIG. 4 shows a tag-less node, that may be connected to other nodes in a multiprocessor system, with a two-level cache hierarchy of set-associative caches and a CPU (which may contain one or many traditional caches, here depicted L0), where CPU 401 generates addresses (ADDR) 402. FIG. 4 also shows a two-level CLB hierarchy of set-associative CLBs, where first-level CLB CLB1 410 and second-level CLB CLB2 420 are indexed with ADDR. As used in the present disclosure, the term "CLB1" may refer to a first-level CLB and the term "CLB2" may refer to a second-level CLB. Each entry in CLB1 410 includes at least an address tag (AT) 411 and a cache location table (CLT) 412. It may store additional information, such as region information (RI) 413. The CLT stores location information (LI) for the cache lines of a corresponding region (also referred to as a micropage). FIG. 4 shows four LI per region as an example. Empirical studies by the inventors shown that 8 to 16 LI per region (i.e., 8 to 16 data units (cache lines) per region) to be cost-effective and efficient. The location information encodes the location where the corresponding cache line can be found within a multiprocessor system. The location information may, for example, contain the identity of a cache where the data unit can be found. The location information may also contain a location within that cache where the data unit can be found. Alternatively, the location information may contain the identity of a node where the data unit can found or contain some symbol that provides information about its location, for example the symbol "MEM" indicates that the data unit can be found in memory. In at least some cases, the symbol "don't know" may indicate that the location of the corresponding data unit is not recorded in the CLT corresponding to the region.

MUX 416 selects the CLT with an AT 411 matching a TAG portion of the ADDR 402 and a MUX 415 selects the LI 414 corresponding to the requested cache line based on the LI-OFFSET portion of ADDR 402. If the cache identity stored in the selected LI corresponds to the L2 cache 440, an address 417 for accessing the requested data unit in L2 CACHE 440 is formed using an INDEX portion of the address 402 and a portion of the location information 414. In the example of a set-associative L2 CACHE 440, that portion contains information corresponding to the associative way where the requested data unit is stored. If the cache identity stored in the selected LI corresponds to the L1 cache 430, an address 418 for accessing the requested data unit in L1 CACHE 430 is formed in a similar way.

For a cache hierarchy consisting of set-associative cache with the same associativity, the number of bits in each LI is dependent on the number of ways and number of caches of the cache hierarchy covered by the CLB. One LI value can be reserved for an invalid pattern ("MEM"). In this implementation, the number of LI bit(s) is equal to the log base 2 of the number of way(s) plus the number of cache levels covered by the CLB plus one (i.e., (way+levels+1)). If the number of ways of the different cache levels varies, or if caches other than set-associative caches are used, those skilled in the art will appreciate that other LI representations are possible. Typically, the size of LI is much smaller than the size of a typical address tag. A 3-level cache hierarchy with 16-way associative caches at each level can be encoded using 5 LI bits.

In the example illustrated in FIG. 4, each entry in the L1 cache 430 and L2 cache 440 to have a backwards pointer (BP), 432 and 442 respectively, associated with its cache line. (DATA), 431 and 441 respectively. In this example, the BP pointers point to their respective associated CTE in CLB2 420. Each CTE in CLB2 420 contains an address tag (AT) 421, a CLT 422 and a CLB1 Pointer (C1P) 423. If the CLB2 entry has a corresponding CLT residing the CLB1 410, its C1P will point to that entry. In that case CLB1 410 will contain the up-to-date information for this region. In that case, the CLE in CLB1 is said to be the active CLB entry, while the CLB entry for the region in CLB2 420 contains a passive entry. CLB2 420 may be required to contain a passive entry for a region if CLB1 410 contains an active entry for the region.

When no matching CTE can be found in CLB1 410, a corresponding CTE may be looked for in CLB2 420 and copied to CLB1, while an old entry in CLB1 copied to CLB2 420, this is referred to as spill and fill or simply spill/fill (SPILL and FILL in FIG. 4). A spill is also for example performed when a traditional inclusive cache evicts a data unit to the next level to make space for a new data unit, which may be brought in (fill) from the next cache level. A similar spill/fill activity will be performed between the different CLB levels, where CLB entries are moved between the CLB levels, since the CLB levels forms an inclusive hierarchy. A directory DIR may be at the root of the CLB hierarchy and spill/fill with the highest level CLBs.

It is possible to initiate access to the requested data unit in parallel with the spill/fill activity.

The contents of the CLBs of a multi-level CLB implementation may be kept consistent with the locations of the data units of the multi-level cache system they manage. A data unit that is moved in the cache hierarchy, including but not limited to movements caused by requests for the data unit from the CPU, evictions of the data unit, prefetching activities and coherence activities, cause an update to its corresponding location information in one or many of the CLBs. For example, in FIG. 4, evicting a data unit 441 from cache 440 can involve the steps of following its associated BP 442 pointer to find its corresponding CTE (which in this example is in the CLB2 420) and updating its corresponding location information to point to the data unit's new location (e.g., storing the MEM symbol). And, if the C1P pointer of the corresponding CLB2's CLE is valid, following the C1P to find its corresponding CTE in the CLB1 410 and updating its location information associated with the cache line. The entry in the CLB2 may not updated if there is a valid C1P pointer. For example, CLTs may be updates such that only active CLTs are updated.

As will be appreciated from the foregoing, using the above-referenced tag-less cache systems, i.e., cache systems where the data unit stored in a cache does not have an address tag associated with it, will result in a number of different types of transactions which will occur when various cache lines located in different storage devices are requested by a CPU 401. The node depicted in FIG. 4 may be a subsystem (or node) of a larger multiprocessor system comprised from several such cache nodes. Keeping the data of the caches in the many nodes coherent requires a cache coherence protocol, for example implementing either snooping or directory-based coherence. The coherence protocol will send coherence requests to the depicted node in FIG. 4 (EXTERNAL REQUESTS). These requests will typically first turn to CLB2 420, which may determine that this cache system does not have the requested cache line (CLB2 miss or a CLB2 hit to an entry with an inactive C1P and the location information of the requested cache line holding the value memory pattern). If so, no further action is needed with respect to the data caches L1 and L2 (known as coherence filtering), but the corresponding LI in the active CLT may nevertheless need to be updated to track a new location associated with the data unit. Otherwise, the CLB2 lookup may provide the requested location information (CLB2 hit and the location information of the requested cache line holding storing the location of the cache line), or it may determine that CLB1 410 stores the associated location information (CLB2 hit and a valid C1P). In the latter case, a lookup in CLB1 410 is needed to determine either the location of the requested cache line or that the cache line does not reside in this cache sub-system. (The corresponding location information in CLB1 contains a memory pattern). Depending on the nature of the coherence request, for example an invalidation request, a read request, or an exclusive read request, the coherence protocol will perform some operations on the requested data unit and possibly change its state. The corresponding LI in the active CLT may also need to be updated to track a new location associated with the data unit Even though the node shown in FIG. 4 consists of two cache levels, someone skilled in the art would understand that nodes can be assembled using other numbers of levels and may contain more than one CPU. Furthermore, the number of cache levels and the number of CLB levels in a node do not need to be identical.

FIG. 5 is a block diagram illustrating a portion of a computer system including two CPUs connected to a two-level cache hierarchy and a two-level cache location buffer (CLB) hierarchy. For example, the computer system in FIG. 5 includes two CPU nodes (580 and 590), each within their own one-level cache hierarchy with one CLB (CLB1A 503 and CLB1B 513) and a private cache L1 CACHE (504 and 514). The system also contains a global shared L2 CACHE 523 (sometimes referred to as a last-level cache (LLC)), which is shared between the two CPUs 501, 511.

A lookup in a CLB1 (513 or 503) selects a single LI based on an address generated by their respective CPUs (501, 511), for example using techniques similar to CLB1 410. As indicated by the three arrows initiated by the two shown CLT entries in CLB1A 503 and CLB 513, the selected LI may identify the location to be either in the corresponding L1 cache (504 and 514 respectively), in the L2 cache 523 or in the other node (showed by 570 and 571 respectively). In this example, CLB1A 503 identified its accessed data to be 505 in the shared L2 cache 523, while CLB1A 503 identified its accessed data to be 505 in its L1 514 (show by the solid arrows).

FIG. 6 is a block diagram illustrating a portion of a computer system including a tag-less cache hierarchy with a single monolithic last level cache. Turning to FIG. 6, FIG. 6 shows a generalized depiction of a tag-less multiprocessor memory system. This example consists of N nodes, ranging from Node-1 601 to Node-N 699. Each node has X levels of CLBs and Y levels of private caches, i.e., caches private to the node. The nodes are connected together with each other through a network on chip (NoC) 650 circuit. NoC 650 also connects the nodes to the directory (DIR) 660, the global last level cache (LLC) 670 and memory 680. DIR 660 is organized similarly to CLBs and has entries that consist of at least an address tag (AT) 661 and a cache location table (CLT) 662. An entry may also contain additional information, such as region information (RI) 663, which is described in more detail below. The highest level CLBs in the nodes (CLB-X 630, 693) spill/fill to/from DIR. DIR also plays a central role in the coherence protocol that keep the contents of the caches and the CLBs coherent and consistent.

The CLBs and DIR can be viewed to form one inclusive "cache hierarchy", caching metadata with information about the content of the data cache hierarchy. The data hierarchy, containing L-1s through L-Ys and the LLC can be viewed as a separate cache hierarchy with no inclusion properties imposed upon it. It may for example by non-inclusive, inclusive or exclusive.

In the example shown in FIG. 6, each node has one CPU, possibly containing zero, one or many traditional tag-based caches, depicted L0-D and L0-I. Memory requests that cannot be satisfied by any of the traditional L0 caches will generate a lookup in the node's CLB-1 (e.g. 610) in search for a corresponding CLB entry CLT, possibly using a scheme similar to CLB-1 410 in FIG. 4. If a corresponding entry is found in CLB-1, the location information (LI) corresponding to the requested data unit can be located in its CLT field (612). The LI identifies a location where the requested data unit can be found. LI residing in the CLB 610 in Node-1 601 may identify either one of the node's own caches (L-1 620 through L-Y 640), the LLC (670), the memory 680, or any of the other nodes (Node-2 690 through Node-N 699) as a location for the data unit it is tracking. The LI may also identify the data unit's location within an identified cache. The LI may also indicate if a data unit resides in any of the traditional caches L0-D or L0-I of a CPU (e.g., CPU-1 610) connected to the node.

If a cache location (or memory) is identified as a location where the data can be found, the request can be satisfied by reading that cache directly without consulting a directory (DIR) 660. If a node is identified as the location where the requested data can be found, a request is sent to the CLB-X of that node and the request satisfied similarly to the EXTERNAL REQUESTS discussed for FIG. 4. Still, the directory does not need to be consulted in order to find the data. This is different from most traditional directory-based coherence schemes, where the directory is consulted and updated for accesses that go outside of a node.

Even though FIG. 6 shows one CPU in each node, someone skilled in the art would realize that a node may contain any number (including zero) of CPUs, GPUs, accelerators or other devices that may access memory, such as I/O devices. Furthermore, the configuration and size of CLBs and caches may differ widely between the nodes.

There may be a strict hierarchical search level-by-level in the inclusive CLB/DIR hierarchy. If the location information is not found at a level CLB-i, a lookup is performed at the next level CLB-(i+1). If the location information cannot be found in the nod's highest level (CLB-X), a lookup is performed in DIR. If location information is found at a CLB level or in DIR, a read request can be sent to the data location identified by its corresponding location information at that level and a new CLE entry corresponding to the requested region is created in CLB-1. The CLB/DIR hierarchy may be inclusive. This implies that if there is an CLB entry available at level CLB-L, there has to be an entry installed at level CLB-(L+1). The CLB entry closest to the CPU is active. There may be inclusion enforced between cache level K (as well as lower cache, i.e., higher up in FIG. 6) and a certain CLB level C (as well as all higher CLB levels, i.e., further down in FIG. 6. As an example, in order for data to be available in any of the caches L-1 620 through L-Y 640, there has to be a corresponding entry in CLB-X 630. If that entry in CLB-X 630 is evicted, all data of the corresponding region should be evicted from caches L-1 620 through L-Y 640. This is referred to as forced eviction. Furthermore, all CLB entries of the same node down to CLB-1 610 also need to be evicted. This is known as forced eviction.

It should be noted that there is no inclusion requirement between the cache levels within a node (e.g., caches L-1 620 through L-Y 640) or between LLC 660 and cache in a node (e.g., caches L-1 620 through L-Y 640). For example, valid data corresponding to a specific address may exist in the L1 cache 620, but not in neither cache L-Y 640 nor in the LLC cache 670. This opens up for cache bypass optimizations, where for example streaming data only need to be installed in L1 (actually, only in L0 if it exists) and at no other levels. However, the corresponding CLB entries (which typically is 50 times smaller its corresponding data region) need to be installed at all levels.

The directory (DIR) 660 contains CLB-like information: address tag (AT) 661, Cache Location Table (CLT) and Region Information (RI). While these fields have the same name as the fields of CLBs (e.g., CLB-X 630), the contents of these fields may differ from the corresponding CLB fields. The RI field 663 of DIR 660 may contain N presence bits (PB), indicating which nodes are tracking the region, where N corresponds to the number of nodes in the system. If bit K in the PB is set it implies that there is a corresponding entry in CLB-X of node K. This further implies that there may be cached data in any of the cache levels L1 through L-Y of node K and also that there may be a corresponding entry in CLB-1 in node K, which would enable the CPU in node K to access any cache line of the corresponding region. While the description refers to an N-bit implementation of the PB information, someone skilled in the art would realize that many scalable techniques used for directory implementation, including but not limited to coarse-grained, limited pointers and linked lists, can be used to implement a similar functionality.

The PB bits can be used to classify regions. A region is classified as a private region (PR) if exactly one of the PB bits of the corresponding entry in the directory 660 is set. Empirical studies show that about 80% on average of all accessed regions are PR regions across a wide selection of studied benchmarks. The region classification PR implies that data of the region may exist only in the one node with its corresponding PB bit set and also guarantees that no other node can access data from the region at this point in time. A node 601 with its PB bit being the only set bit in DIR may be notified that the corresponding region is a private region (PR) and may record the regions classification in its corresponding region information (RI) in its CLB (e.g. in CLB-1 610 through CLB-X 630). PR regions may be accessed efficiently in many respects. For example, no global coherence is needed for the node to gain write permission for a data unit present in the node for which the node currently only has read permission (to upgrade the data unit from state S to state E), since only one node may have caches copies of its data and no other node can access any of the data units of the region. Also movements of data units of a PR region may be implemented efficiently, since data can be moved up and down the entire cache hierarchy (e.g., performing an eviction from L-X to LLC or moving data from LLC to L-1) without the need to inform any structures outside the node. The movement also needs to be recorded in a CLB local to the node (610 through 630). This implies that the CLT information of a PR region stored in the CLBs of the node (610 through 630) may differ (e.g., be more up-to-date) than the CLT information of the region stored in DIR 660.

When a second node (e.g., 690) accesses a PR region (empirical studies show that this is a relatively rare event), it will miss in all its CLBs 691 through 693 and will send a request to DIR 660 to get the appropriate location information LI needed to access the data and also to allow for creations of its own CLB entries in CLB 691 through 693. Since this request is for a PR region, DIR 660 may not have up-to-date information, it needs to get up-to-date location information from node 601 and make sure that CLBs of node 601 no longer marks the region as PR, update its own CLT information for the region, set the PB bit corresponding to Node-2 690 and send appropriate CLB information for the region to node 690. Node-2 690 can now create its own local CLB entries associated with the region. It may be required that Node 601 complete all its ongoing direct-to-data memory requests for the region before sending up-to-date location information to DIR 660.

If yet another node (e.g., Node-N 699) accesses the region, it will also miss in all its CLBs and will also send a request to DIR 660, which now has up-to-date information about the region and can reply with the appropriate information to Node-N 699 and also will set the PB bit of the region for the requesting node (i.e., node 699)

Regions with more than one PB bit set are classified as shared regions (SR). This implies that more than one node have CLBs tracking the location information for this region. It also implies that the nodes with corresponding PB bits set may store data units of the region in any of their caches (e.g., 620 through 640). A request from a CPU (e.g., CPU-1 602) to access a data unit, which cannot be satisfied locally within the node (e.g., by caches L-1 620 through L-Y 640), may need to initiate a global coherence transaction if the region is classified as SR.

A global coherent read transaction to an SR or PR region (a read which cannot be satisfied from a local cache (e.g., caches L-1 620 through L-Y 640)) can utilize the location information retrieved from its local CLBs (e.g., CLB-1 610 through CLB-X 630) to access the data directly without involving the DIR 660 or communicating with any nodes other than the node that may be identified by the location information. This is referred to herein as a direct-to-master access. Empirical studies show that 75% of all global coherent transactions to SR regions are direct-to-master read transaction accesses. So, if 20% of the global transactions initiated by CPUs are to SR pages and 75% of those do not need to access DIR, then 95% of the global coherence transactions do not need to access DIR when using at least some of the above-referenced cache structures and techniques, whereas all global coherent transactions need to access DIR for traditional directory-based protocols.

Since SR regions have several nodes tracking the location of its data units, their data unit movements need to be reflected in all nodes tracking the region (i.e., those nodes having an active CLB entry for the region) and the location information of the moved data units is updated in those nodes. The location information of CLBs of different nodes tracking the data unit should be updated in a coherent manner such that the CLBs agree about where the data resides (referred to as its the master location). It may also be highly likely or, alternatively, guaranteed that a data unit location accessed based on location information retrieved from a CLB contains the correct data (referred to as determinism).

One common reason for such data unit movements is global coherent write requests, i.e., a requesting node that currently does not have write permission to a data unit requests write permission through a global coherent request, for example an invalidation request or an exclusive read request. After the request has completed, the data unit will only reside in the requesting node.

Global coherent write requests may be sent by a requesting node (e.g., 601) to the directory 660, which locates the corresponding directory entry, retrieves the corresponding PB bits for the region and forwards a request to all nodes (except the requesting node) which have a corresponding PB bit set, which nodes are referred to as the slave nodes (for example nodes 690 and 699). The slave nodes send ACK messages when they have made sure that any future requests for the data unit originating in the slave node will be directed to the requesting node. This can for example be achieved by changing their location information for the data unit in their CLBs to point to the requesting node (601), which will become the new master node. The ACK messages can either be sent to the DIR 660, which aggregates them and sends an ACK to the requesting node once all ACKs have been received, or sent directly to the requesting node 601. Once the requesting node knows that all ACKs have been received, it has acquired exclusive write permission for the cache line and completes the request. A completion message may be sent to the DIR 660 upon the completion of the request.

Another common reason for data movement is evictions (also called replacements). Evictions local to a node, for example eviction from L-1 620 to L-Y 640 are handled locally, tracked by its local CLB entries and are not visible outside the node. However, a global eviction of a master data unit, for example from location 641 in L-Y 640 to a new location 671 in LLC 670 must be reflected by all nodes tracking the region (i.e., all nodes with CLB entries for the region). Global eviction may be implemented by first copying the value of the data unit stored in its old location (641) to the new location (671), while keeping the data stored in the old location (641) valid. Then, a global coherent eviction request, with information about the new location (671), is sent from the requesting node (e.g., 601) to DIR (660), which forwards a request to the slave nodes (e.g., 690 and 699). Once the slave nodes have updated their corresponding location information to the new location (671) they send an ACK message. Once the requesting node knows that all ACKs have been sent, it has acquired eviction permission for the data unit and can reclaim the old location and the request is completed. A completion message may be sent to DIR 660 upon the completion of the request.

A slave node may not send ACK messages until some its outstanding requests (for example all direct-to-master requests) for the requested cache line have been completed.

The directory 660 may implement a blocking mechanism that ensures that there can be at most one outstanding global request of certain types for each data unit. Examples of such request types could be global coherent write requests and global coherent eviction requests. The blocking for a cache line ends after the request has been completed, or as otherwise specified by the coherence protocol. The blocking mechanism can be exact, for example implemented by one lock per data unit in the directory, or could be an overapproximation, where addresses hash to a limited pool of locks and that the blocking of a data unit will block accesses for all other data units hashing to the same lock.

The blocking may be done with a region granularity, instead of a data unit granularity, and some of the CLB/directory spill/fill requests also need to block until their updates have been completed. This guarantees that no global coherent write requests are in progress while the nodes and directory spill/fill CLB information.

Another useful region classification is a region with no PB bits associated with the region being set in DIR 660. This implies that the regions data units cannot be present in any of the node's caches L-1 though L-Y and that none of the nodes currently can access its data units. This is referred to as an untracked region (UR). Data of UR regions may still be cached in the LLC. Data units of UR regions can be evicted from LLC 670 without any global coherence requests. A region with no corresponding entry in DIR 660 is classified as a memory region (MR). Data units of MR regions cannot be cached in neither the nodes nor in the LLC. Replacing a CLT entry from DIR 660 implies that all data unites of that region should be forcefully evicted from the LLC.

The cache system of FIG. 6 may be a tag-less cache system, i.e., a cache system where a data unit stored in a cache (for example the caches L-1 through L-Y of the nodes and the LLC) not have an address tag associated with it. Instead, a location information with an address tag associated with it will identify the location where the data unit is stored. The traditional caches included in FIG. 6 (L0-I and L0-D), may still have address tags associated with their cache data units though.

To summarize the discussion above regarding FIGS. 3-6, it will be appreciated by those skilled in the art that a cache hierarchy may be implemented using tag-less caches, which can provide a more efficient way to represent caches. In a tag-less cache, the data units (cache lines) do not have address tags associated with them. Instead a backwards pointer points to a CLB entry that tracks the cache line by "pointing" to its location using a location information pointer. However, if a cache line needs to be quickly removed from the cache, the tag-less caches provide no simple means to put the cache line in a traditional buffer, such as a victim buffer. Typically, cache lines in traditional victim buffers need to be searchable, and thus need to have address tags attached to them.

Accordingly, it would be desirable to provide systems and methods to provide efficient buffer functionality in a tag-less cache hierarchy.

SUMMARY

According to at least some example embodiments of the inventive concepts, a data management method for a computer system including at least one processor and at least a first cache, a second cache, a victim buffer (VB), and a memory allocated to the at least one processor, includes selecting a victim cache line to be evicted from the first cache; finding a VB location corresponding to the victim cache line from a set of the VB; copying data of the victim cache line to a data field of the VB location; copying a backward pointer (BP) associated with the victim cache line to a BP field of the VB location; and reclaiming victim space of the first cache using the VB.

According to at least some example embodiments of the inventive concepts, a multi-processor system includes a memory; a plurality of nodes, each of the plurality of nodes including at least one processor, a plurality of caches, and a plurality of cache location buffers (CLBs); and one or more victim buffers (VBs), wherein, a processor of an N-th node among the plurality of nodes is configured to find a VB location from a VB, from among the one or more VBs, corresponding to a victim cache line evicted from a first cache of the plurality if caches of the N-th Node, copy data of the victim cache line and a backward pointer associated with the victim cache line to fields of the VB location, and reclaim victim space of the first cache using the VB.

According to at least some example embodiments of the inventive concepts, a non-transitory, computer-readable storage medium comprising computer-executable instructions that, when executed by at least one processor, cause the at least one processor to perform operations including, selecting a victim cache line to be evicted from a first cache allocated to the at least one processor, finding victim buffer (VB) location corresponding to the victim cache line from a set of a VB allocated to the at least one processor, copying data of the victim cache line to a data field of the VB location, copying a backward pointer (BP) associated with the victim cache line to a BP field of the VB location, reclaiming victim space of the first cache using the VB, and controlling a write-back operation for, a second cache allocated the at least one processor, or a memory allocated to the at least one processor.

BRIEF DESCRIPTION OF THE DRAWINGS

The above and other features and advantages of example embodiments of the inventive concepts will become more apparent by describing in detail example embodiments of the inventive concepts with reference to the attached drawings. The accompanying drawings are intended to depict example embodiments of the inventive concepts and should not be interpreted to limit the intended scope of the claims. The accompanying drawings are not to be considered as drawn to scale unless explicitly noted.

DETAILED DESCRIPTION

Figure 1:
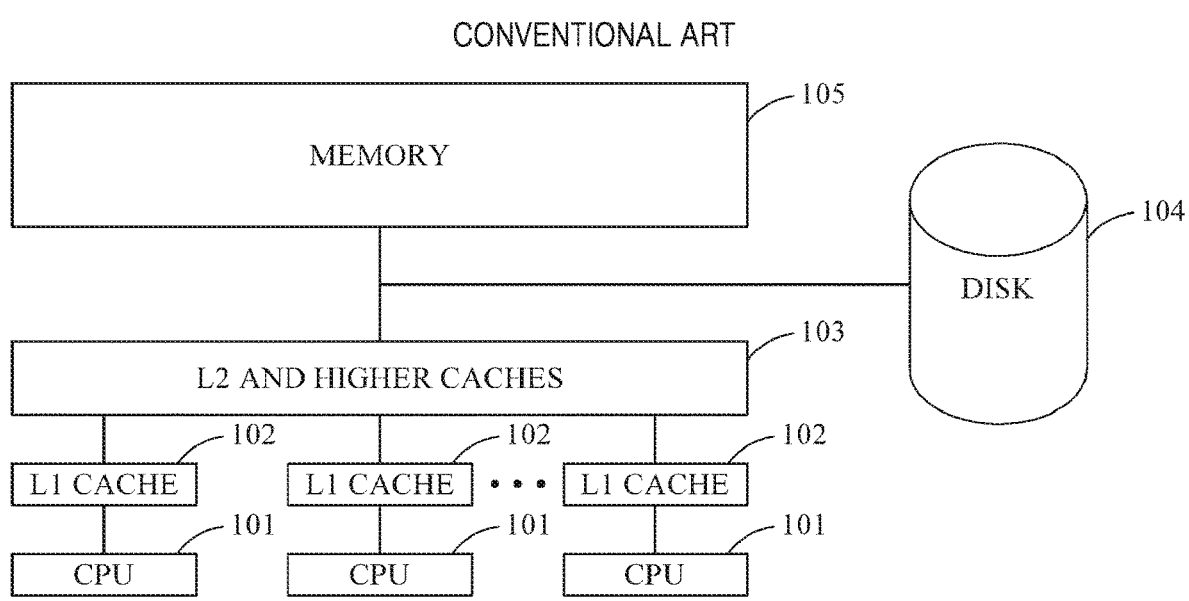
FIG. 1 is a block diagram illustrating a portion of a computer system.

As is traditional in the field of the inventive concepts, embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the embodiments may be physically separated into two or more interacting and discrete blocks, units and/or modules without departing from the scope of the inventive concepts. Further, the blocks, units and/or modules of the embodiments may be physically combined into more complex blocks, units and/or modules without departing from the scope of the inventive concepts.

Cache lines residing in caches may be evicted and may be replaced by other cache lines. Accordingly, the evicted cache line may need to be removed from the cache to make space for the new cache line. If the evicted cache line is dirty, the evicted cache line may need to be written back to a next-level cache or to memory.

Figure 4:
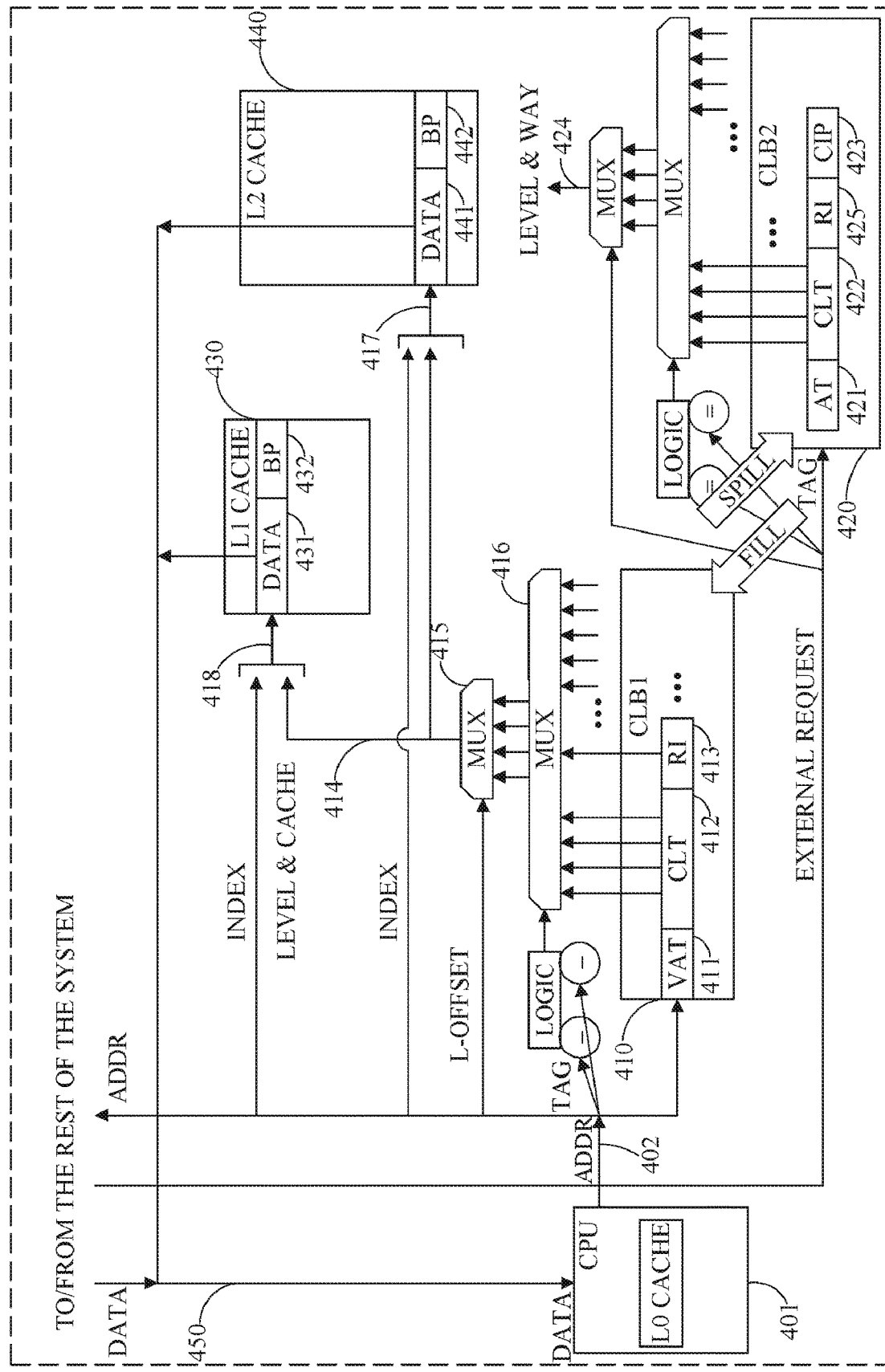
FIG. 4 is a block diagram illustrating an example implementation of a tag-less cache.
Figure 5:
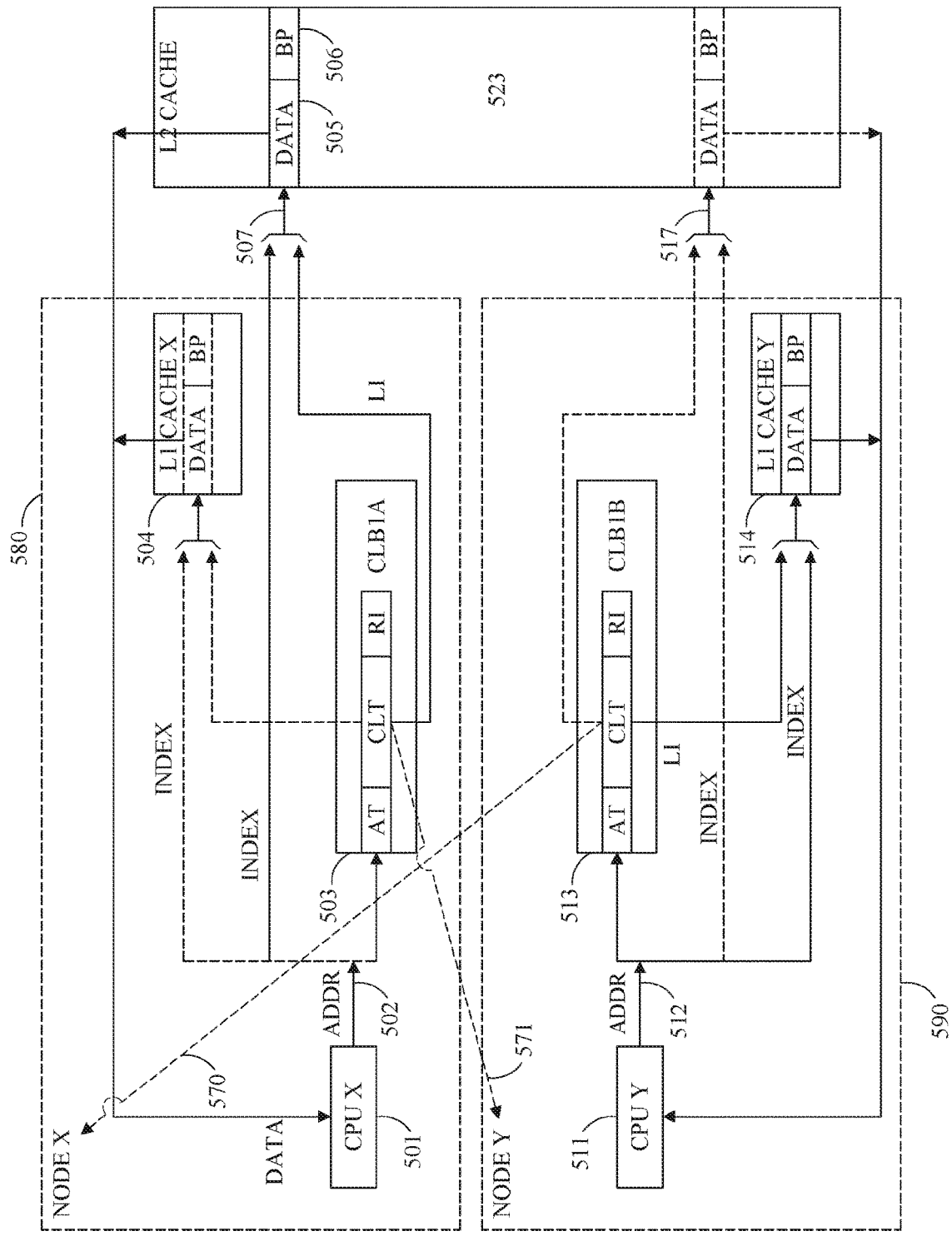
FIG. 5 is a block diagram illustrating a portion of a computer system including two CPUs connected to a two-level cache hierarchy and a two-level cache location buffer (CLB) hierarchy.
Figure 6:
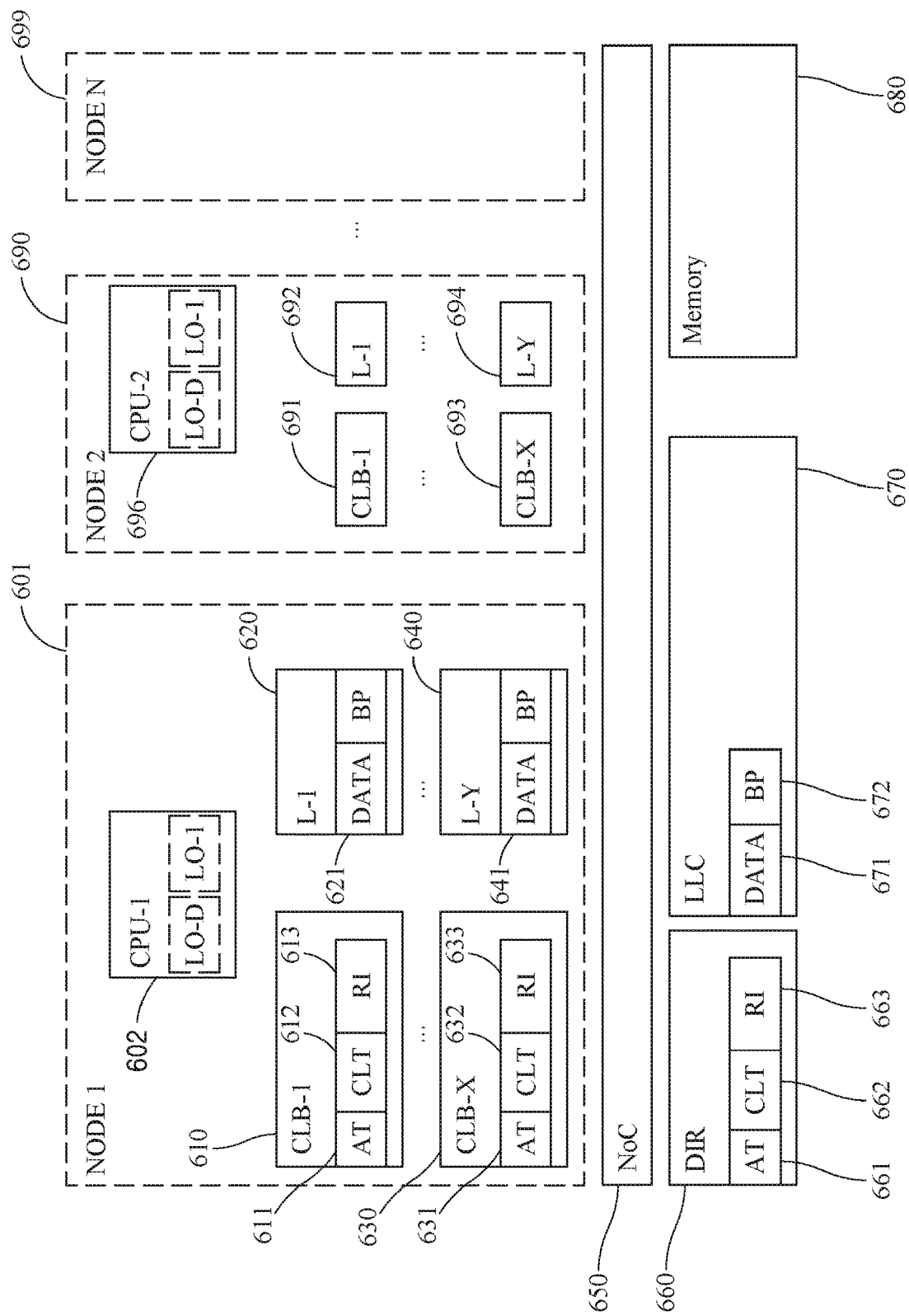
FIG. 6 is a block diagram illustrating a portion of a computer system including a tag-less cache hierarchy with a single monolithic last level cache.

One of the advantages of tag-less caches, as depicted in FIG. 4 and FIG. 5, is that there is no inclusion enforced between cache levels. A cache line residing in L1 cache 430 or 514 is not required to have space allocated in the next level L2 cache 440 and 523, respectively. Tag-less caches may also not require that the cache line has space allocated in a next-level L3 or last level cache (LLC) 670, as depicted in FIG. 6. Accordingly, a cache line evicted from a tag-less L1 cache may need to be written back to memory. In a multiprocessor implementation of a tag-less cache, evicting a dirty cache line from L1 to memory may be performed in three steps: first the cache line is copied to memory; once it can be guaranteed the copying to memory has been globally performed, a NewMaster message is sent to the other nodes with a cache location buffer (CLB) entry for the corresponding region to inform the other nodes that memory is not the new master location of the cache line, and lastly, the cache line's location in the L1 cache can be reclaimed. Since the memory is relatively slow and typically resides far away, the time it takes from when an L1 cache eviction is initiated until the L1 cache eviction is completed can be substantial and far longer than it would take to bring the new cache line from L2. Thus, in order to not hold up the progress of the execution, it may be advantageous to determine a more efficient way to dispose of the evicted cache line.

A computer system may utilize a victim buffer (VB) to quickly dispose of a victim from an L1 cache. The VB is a small and associative buffer for storing cache lines (with their address tags) on their way to be evicted. On certain read requests and external requests from the rest of the system, the address tags of the cache lines in the VB need to be searched for a match. In the case of a match, a read request may be satisfied by reading the corresponding cache line. The advantage of the VB is that the evicted cache line can be quickly removed from the L1 cache and the evicted cache line's former location in the L1 cache can be reused by the new cache line within a few cycles. However, in a tag-less system, not all requests carry the full address of their requested cache line which is why it may be difficult or, alternatively, impossible to perform victim buffer searches based on addresses in a computer system implementing tag-less cache hierarchy. Furthermore, tag-less caches avoid costly address-based associative searches in order to provide energy efficient implementations. Accordingly, it may be advantageous to develop a new tag-less buffer solution.

Figure 7:
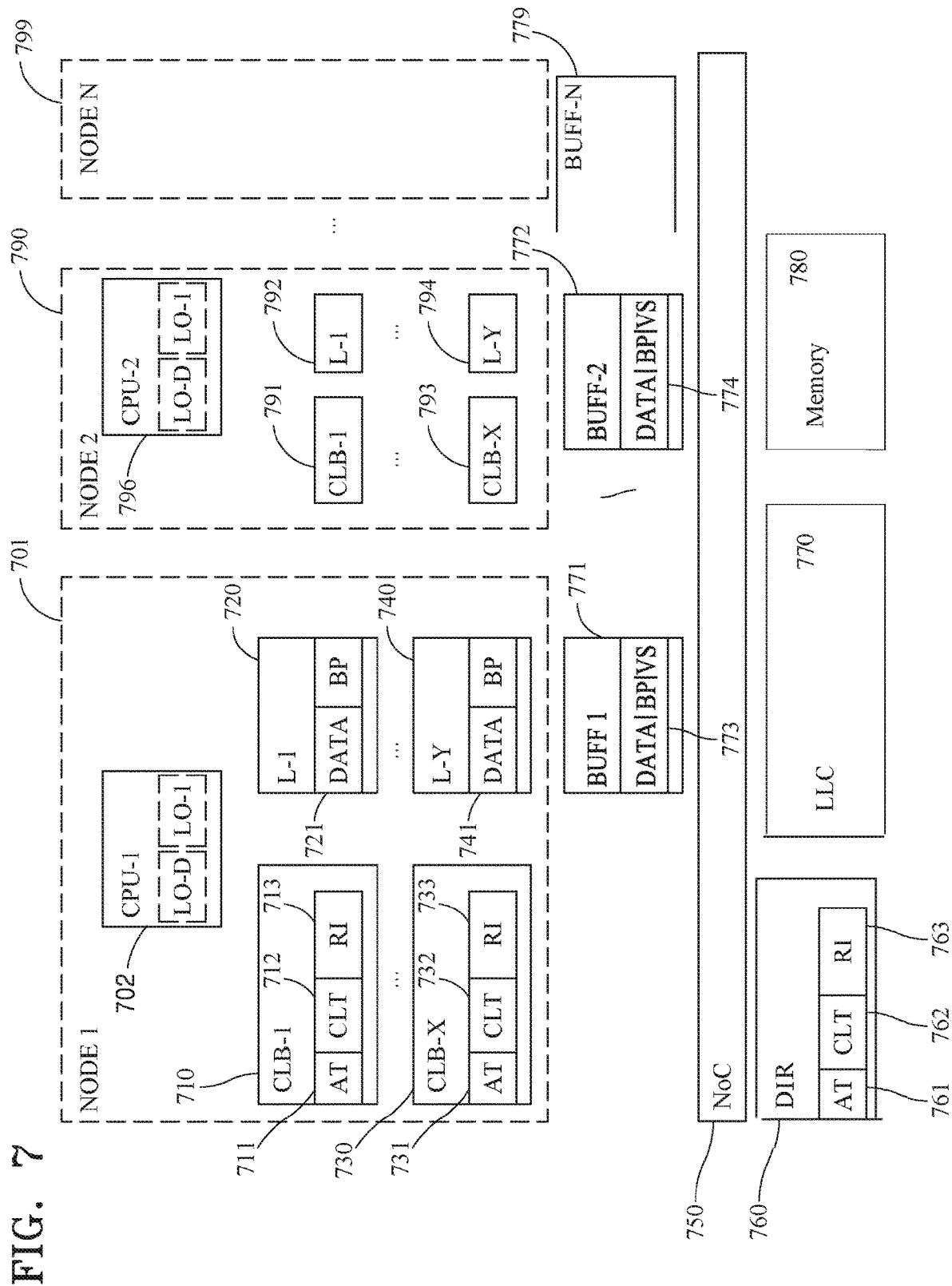
FIG. 7 is a block diagram illustrating a portion of a computer system including a tag-less cache hierarchy with a single monolithic last level cache and a victim buffer according to at least some example embodiments of the inventive concepts.
Figure 8:
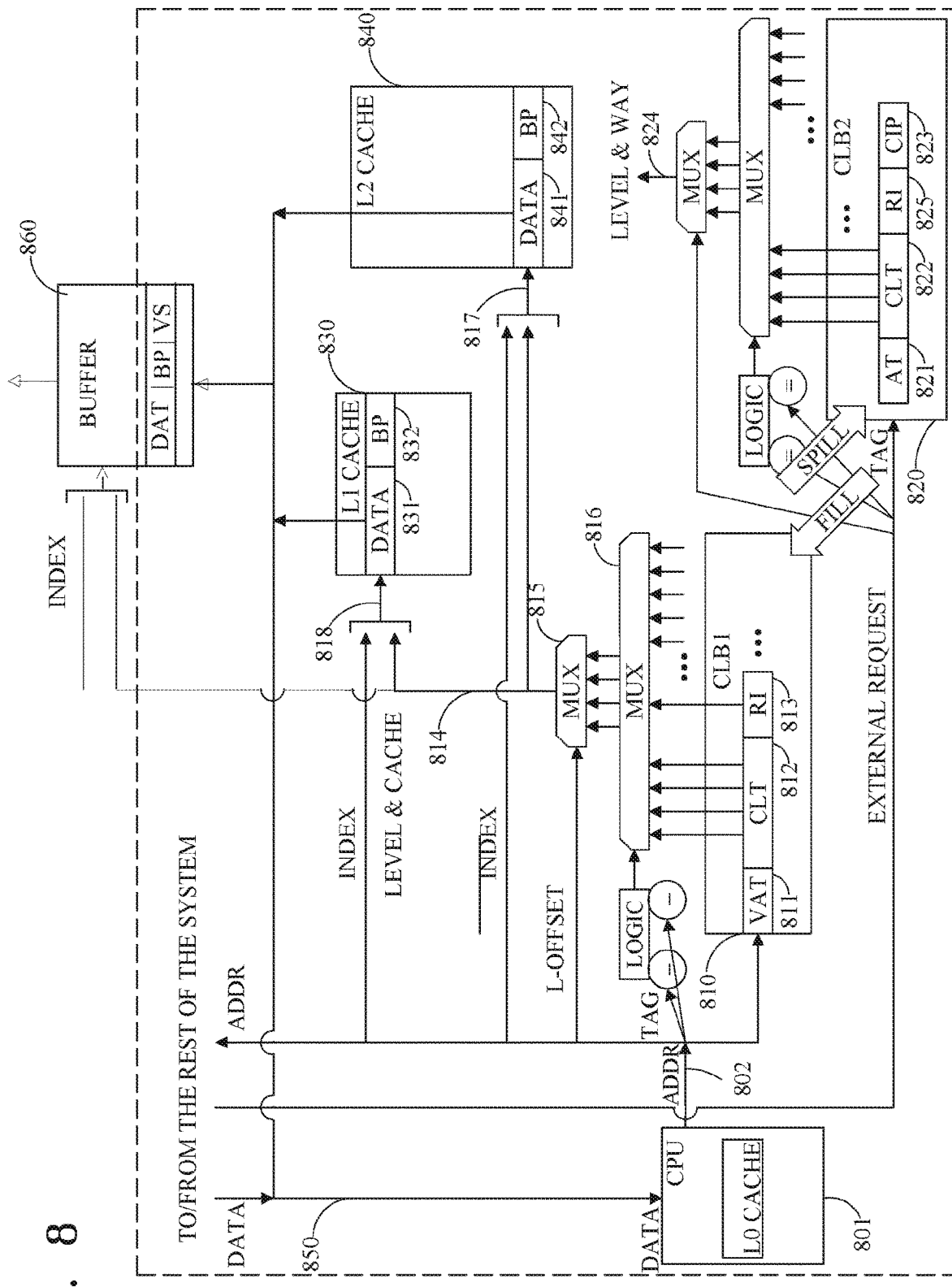
FIG. 8 is a block diagram illustrating a portion of a computer system including two CPUs connected to a two-level cache hierarchy and a two-level CLB hierarchy, and a victim buffer, according to at least some example embodiments of the inventive concepts.

FIG. 7 is a block diagram illustrating a portion of a computer system including a tag-less cache hierarchy with a single monolithic last level cache and a victim buffer according to at least some example embodiments of the inventive concepts. FIG. 8 is a block diagram illustrating a portion of a computer system including two CPUs connected to a two-level cache hierarchy and a two-level CLB hierarchy, and a victim buffer, according to at least some example embodiments of the inventive concepts.

Turning to FIG. 8, the computer system in FIG. 8 may have a structure similar to that of the computer system of FIG. 4. According to at least some example embodiments, the computer system of FIG. 8 may differ from that of FIG. 4 in that the computer system of FIG. 8 is extended with a tag-less set-associative victim buffer VB (BUFFER 860). The VB is indexed in a similar manner as the L1 and L2 caches. An index may either be formed by virtual index using virtual ADDR bits 802 (assuming that ADDR is virtual address), formed as a physical index from ADDR 802 (assuming that ADDR is a physical address) or formed as a physical address based on using some of the physical address (PA) stored as part of the region information (RI) 813 associated with each region. Further, according to at least some example embodiments of the inventive concepts, the way information for the set-associative VB 860 is produced in a manner similar to that in which the way information for the L1 and L2 caches is produced. The way information for the set-associative VB 860 is stored as part of the location information (LI) and is carried by the level/way information 814. According to at least some example embodiments of the inventive concepts, the VB 860 may look like yet another set-associative cache level to CLB1. However, the associativity of the VB 860 may be different from that of one or both of the L1 and L2 caches. Consequently, the LI encoding used for entries of the VB 860 may have a format that is different from that used for entries of one or both of the L1 and L2 caches.

Thus, according to at least some example embodiments of the inventive concepts, the computer system illustrated in FIG. 8 may receive a request for a victim cache line. In response to the request for the victim cache line, the computer system may match an address included in the request with a plurality of entries in a CLB associated with at least one of a first cache (e.g., the L1 cache) and a second cache (e.g., the L2 cache). Further, the computer system may generate level and/or way information based on the matching of the address included in the request; and read the data of the requested victim cache line from the VB (e.g., VB 860) using the generated level and/or way information.

According to at least one example embodiment of the inventive concepts, each entry in the VB 860 is formed by at least three parts: the cache line data DAT, a backwards pointer BP identifying a CLB entry storing the LI associated with the VB entry, and a victim space identifier field (VS) storing either LI for a higher level cache to which the victim cache line should be written or the address in memory to which the victim cache line should be written. According to at least some example embodiments of the inventive concepts, a special state machine drains the VB of its entries and performs the actual write-back operations.

According to at least one example embodiment of the inventive concepts, the VB 860 is used to hold victims (i.e., evicted cache lines) from both the L1 cache and L2 cache which are targeting higher-level caches (e.g., L3 or LLC) or memory, even though only the L1 eviction functionality is explained below.

According to at least one example embodiment of the inventive concepts, a cache line is evicted from L1 cache 830 by the following steps:

1) A dirty cache line 831 is selected to be evicted from L1 cache 830.
2) A free location in VB 860 with way=W is found in the VB set corresponding to the selected cache line, referred to as the VB location.
3) DATA 831 is copied to the DATA field of the VB location and the backward pointer (BP) associated with the victim cache line is written to the VB field of the VB location.
4) BP 832 is used to find the corresponding region within CLB tracking DATA 831 (no address comparison is needed to find the region).
5) The location information in the region is changed to point to the VB location. For example, the LI within that region is changed to point to the VB location (level=VB, way=W); and a physical address portion (i.e., a portion of an RI including a physical address) is read from the region's RI 813.
6) The victim space in L1 can now be reclaimed.
7) The physical address is written to the VS field of the VB location in the case of a victimization to memory. Otherwise, for example, in the case of victimization to another cache (which, according to at least some example embodiments of the inventive concepts, may be a higher-level cache, e.g., the L2 cache), the LI for the destination (e.g., location information for the L2 cache) is written to the VS field.
8) A write-back operation is performed. For example, the state machine can start its write-back work and copy the cache line to the memory location or to higher-level memory (e.g., an L2 cache location); send the New-Master; and change the LI in CLB to point to memory (i.e., by storing the value "Mem" as the LI value). The CLB entry is found using the BP associated with the victim cache line in the VB.
9) The VB location may be freed up when the aforementioned write-back operation is complete.

The term "victim space," as used in the present disclosure, means the location in a first cache where a victim cache line was stored prior to the victim cache line being evicted from the cache. The term "victim space identifier field," as used in the present disclosure, may also be referred to as "VS" and means a field in a VB location of a VB that identifies a location in a cache or memory to which data of a corresponding victim cache line (i.e., a victim cache line corresponding to the VS) stored in the VB will be written-back (e.g., when the above-referenced write-back operation is performed).

According to at least some example embodiments of the inventive concepts, some or all of steps 1-9 discussed above may be executed, or controlled, by one or more state machines. According to at least some example embodiments of the inventive concepts, the one or more state machines may be embodied by a circuit or circuitry structured to execute, or control, some or all of steps 1-9 discussed above.

According to at least some example embodiments of the inventive concepts, the above-referenced write-back operation may include reading a physical address from a victim space identifier field of the VB location; and copying the data of the victim cache line of the data field to a space in the memory corresponding to the physical address. According to at least some example embodiments of the inventive concepts, the above-referenced write-back operation may include finding an entry in the CLB pointed to by the BP of the BP field; and changing location information of the entry to point to the space in the memory where the write-back operation is performed. According to at least some example embodiments of the inventive concepts, the above-referenced write-back operation may include reading location information from a victim space identifier field of the VB location; and copying the data of the victim cache line of the data field to an entry of the second cache corresponding to the location information.

A VB may be a location at the edge of a 2-level cache hierarchy, as shown by FIG. 8, may be located between an L1 cache and an L2 cache (not shown), or may sit in between the private caches L-1 720 through L-Y 740 of a multiprocessor NODE 701 and the shared cache(s) LLC 770 in a multiprocessor system, as shown in FIG. 7. In this configuration, the VB buffer can be used to quickly dispose an evicted cache line from a cache local to the node, as discussed in conjunction with FIG. 8, but can also speed up forced evictions from NODE 701.

As is illustrated in FIG. 7, according to at least some example embodiments of the inventive concepts, a computer system may include a memory; a plurality of nodes (e.g., nodes NODE 1~NODE N), where each of the plurality of nodes includes at least one processor (e.g., CPUs CPU-1 and CPU-2), a plurality of caches (e.g., caches L-1~L-Y in nodes NODE 1~NODE N, and a plurality of cache location buffers (CLBs) (e.g., CLBs CLB-1~CLB-X in nodes NODE 1~NODE N). According to at least some example embodiments of the inventive concepts, the computer system illustrated in FIG. 7 also includes one or more victim buffers (VBs) (e.g., VBs BUFF 1 and BUFF 2). Further, according to at least some example embodiments of the inventive concepts, a processor of an N-th node (e.g., a CPU, which is not illustrated, of NODE N in FIG. 7) among the plurality of nodes (e.g., nodes NODE 1~NODE N) is configured to find a VB location from a VB, from among the one or more VBs (e.g., VBs BUFF 1 and BUFF 2), corresponding to a victim cache line evicted from a first cache of the plurality if caches of the N-th Node (e.g., an L-1 cache, which is not illustrated, of NODE N in FIG. 7), copy data of the victim cache line and a BP associated with the victim cache line to fields of the VB location, and reclaim victim space of the first cache using the VB.

According to at least some example embodiments of the inventive concepts, the processor of the N-th node may be further configured to find region of a cache location buffer (CLB) in the N-th node for tracking the data of the victim cache line using the backward pointer (BP), and change the location information in the region to point to the (VB) location. According to at least some example embodiments of the inventive concepts, the processor of the N-th node may be further configured to read location information for a second cache, which is the upper level of the first cache among the caches of the N-th Node, from region information of the region, write the location information for the second cache in field of the VB location and control a write-back operation for the second cache using the VB.

According to at least some example embodiments of the inventive concepts, the processor of the N-th node may be further configured to, in response to receiving a request for the victim cache line, match an address included in the request with a plurality of entries of the plurality of CLBs, respectively, generate level and/or way information based on the matching of the address included in the request, and read the data of the victim cache line using the generated level and/or way information.

According to at least some example embodiments of the inventive concepts, the plurality of nodes (e.g., nodes NODE 1~NODE N) share one of more VBs (e.g., VBs BUFF 1 and BUFF 2). Alternatively, according to at least some example embodiments of the inventive concepts, each node from among the plurality of nodes (e.g., nodes NODE 1~NODE N) includes its own VB.

Referring now to FIG. 6, according to at least some example embodiments of the inventive concepts, if an entry in CLB-X 630 is evicted, all data of the corresponding region should be evicted from caches L-1 620 through L-Y 640. Furthermore, all CLB entries of the same node down to CLB-1 610 also need to be evicted. This is known as forced eviction.

Even though, according to at least some example embodiments of the inventive concepts, the replacement algorithm used for CLB-X should make forced evictions fairly rare, the worst case forced eviction may need to evict up to 16 dirty cache lines. During the forced eviction, some cache lines of the evicted region may already reside in the VB, and may already be on their way to be evicted. If the forced eviction is not handled with care forced eviction may both take a long time and it may also jeopardize the correctness of the system by losing track of a cache line on its way of being evicted.

Returning to FIG. 7, according to at least one example embodiment of the inventive concepts, upon a forced eviction, the dirty cache lines in the NODE 701 region are quickly transferred to the VB 771 using the steps outlined above for the FIG. 8 VB eviction process. Then, the evicted region is forced out to free space in the CLB-X for another region. During this step, any LI of the region still pointing to a VB 771 location will change the corresponding location LI in the corresponding CLT 762 in DIR and any corresponding CLB locations in NODE 790 through 799 to also point to that VB location before the evicted region can complete its eviction.

It should be noted that a cache line residing in the tag-less VB can be found by reading requests and external requests using the normal way of locating cache lines in a tag-less cache hierarchy while the cache line residing in the tag-less VB resides in VB: by a normal CLB lookup to find LI and then following the LI to access the cache line from the identified location.

Though, for the purpose of clarity, most descriptions herein generally describe techniques for how a cache line is located and returned to a requesting CPU, it will be apparent to those skilled in the art that there are various ways in which a requested word contained within the cache line can be selected and returned to the CPU. cache line For clarity, most descriptions herein describing the handling of data of cache hierarchies describe exclusive cache hierarchies. Those skilled in the art would understand that one or more of the example embodiments can be extended to also cover inclusive memory hierarchies and non-exclusive memory hierarchies.

Figure 2:
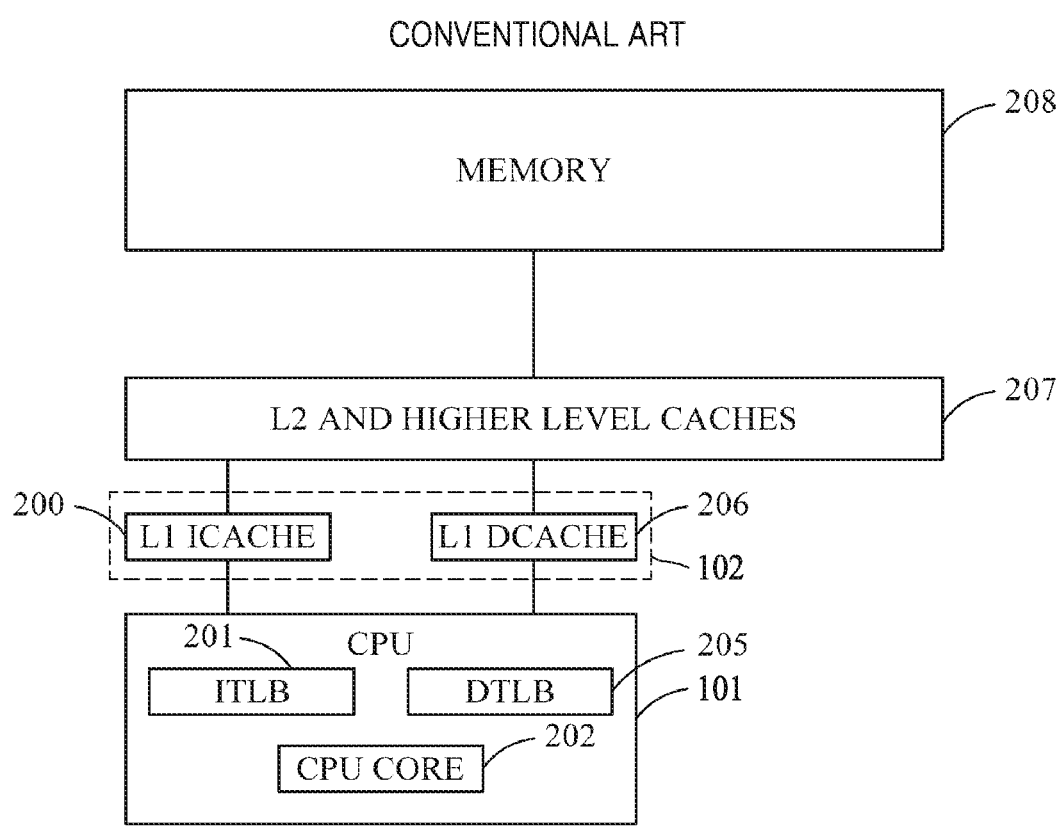
FIG. 2 is a block diagram for explaining an example cache hierarchy of a computer system.
Figure 3:
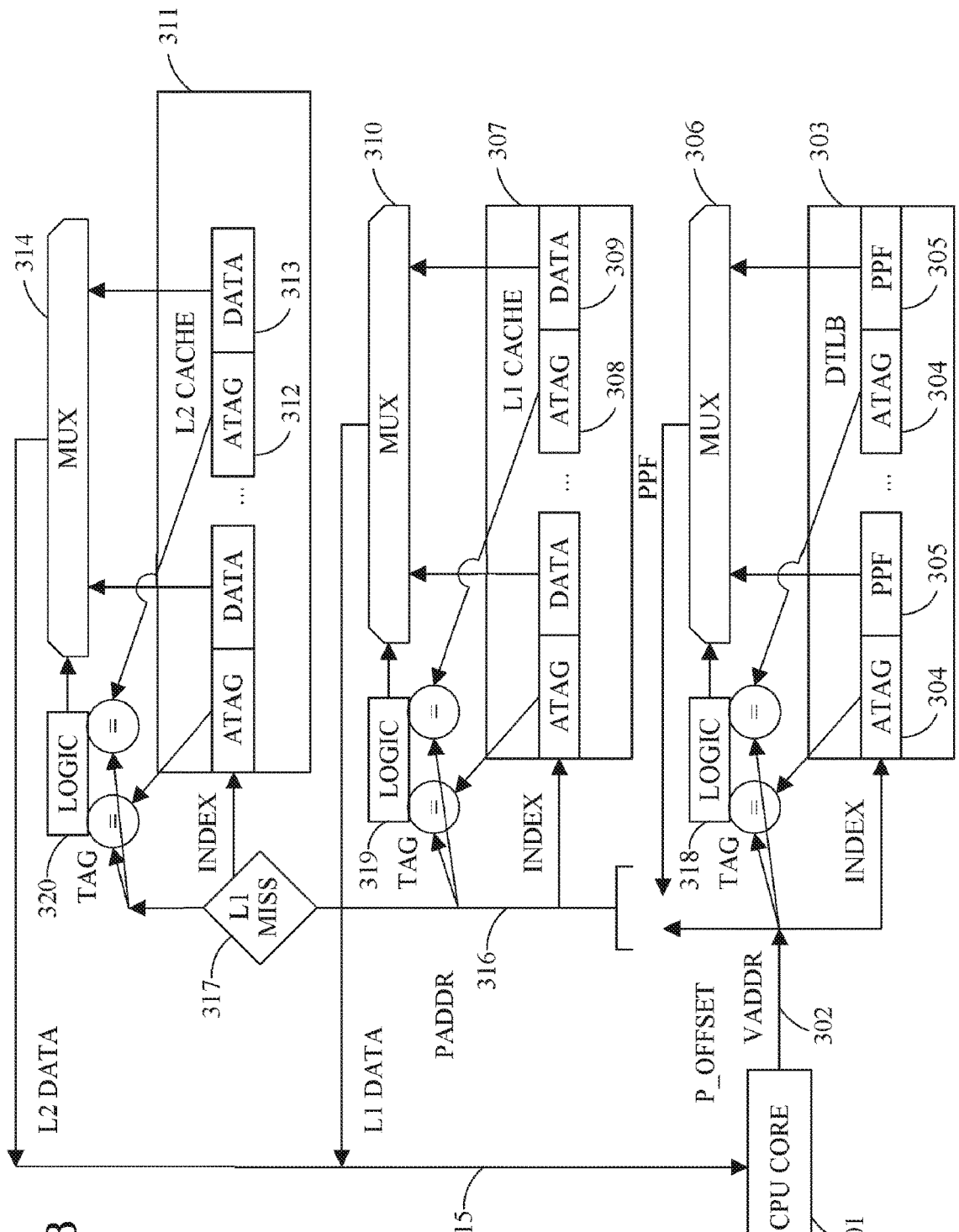
FIG. 3 is a block diagram for explaining a conventional implementation of a two-level cache hierarchy including a set-associative caches and a set-associative data translation look-aside buffer (TLB).

Although one or more of the example embodiments of the inventive concepts described above are useful in association with both uni-processor systems and multi-processor system, such as those illustrated and described above with respect to FIGS. 1 and 2 respectively, one or more of the example embodiments of the inventive concepts are illustrated primarily in association with a uniprocessor system. However, those skilled in the art will appreciate that one or more example embodiments of the inventive concepts illustrated in association with a uni-processor system are not limited to such an implementation. For example, though FIG. 8 illustrates a single CPU for the purpose of simplicity, the portion of a computer system illustrated in FIG. 8 may be a portion of a multi-processor system according to at least some example embodiments of the inventive concepts.

Although described above in the context of certain example computer architectures, caching exists in many other settings within, as well as outside, the example computer systems illustrated in FIGS. 7 and 8, and those skilled in the art will understand that at least some example embodiments of the inventive concepts described above within the context of computer system may also be applied to such other contexts. An example of such usages is the virtual memory system which caches data from a slow, high-capacity storage, such as a disk or FLASH memories, into a faster and smaller high-capacity memory that could be implemented using dynamic RAM. Other examples of caching in a computer system include, but are not limited to, disk caching, web caching and name caching. The organization and caching mechanisms of such caches may vary from those of the caches discussed above, e.g., variances in the size of a set, their implementation of sets and associativity, etc. Regardless of the implementation of the caching mechanism itself, the at least some example embodiments of the inventive concepts are applicable for implementing the various caching schemes.

The methods or flow charts provided in the present application may be implemented in a computer program, software, or firmware tangibly embodied in a computer-readable storage medium for execution by a general purpose computer or a processor.

Example embodiments of the inventive concepts having thus been described, it will be obvious that the same may be varied in many ways. Such variations are not to be regarded as a departure from the intended spirit and scope of example embodiments of the inventive concepts, and all such modifications as would be obvious to one skilled in the art are intended to be included within the scope of the following claims.

What is claimed is:

1. A data management method for a computer system including at least one processor and at least a first cache, a second cache, a victim buffer (VB), and a memory allocated to the at least one processor, the method comprising:
   selecting, as a victim cache line to be evicted from the first cache, a cache line stored in the first cache;
   finding a VB location corresponding to the victim cache line from a first set of the VB, the VB location being a location in the VB, the VB being a set-associative buffer including a plurality of sets, the plurality of sets including the first set;
   copying data of the victim cache line to a data field of the VB location;
   copying a backward pointer (BP) associated with the victim cache line to a BP field of the VB location;
   reclaiming victim space of the first cache by storing data of a new cache line in the victim space, the victim space being a location in the first cache where the data of the victim cache line is stored prior to the victim cache line being evicted from the first cache; and
   performing a write-back operation by writing, to at least one of the second cache or the memory, the data of the victim cache line that was copied to the data field of the VB location.

2. The method of claim 1,
   wherein the computer system further includes a cache location buffer (CLB) that includes one or more CLB entries for storing location information of data of one or more cache lines,
   wherein the reclaiming the victim space comprises:
   finding, using the BP, a first CLB entry, the first CLB entry being a CLB entry from among the one or more CLB entries that stores location information of the data of the victim cache line; and
   changing the location information of the first CLB entry to point to the VB location.

3. The method of claim 2,
   wherein the first CLB entry includes region information, and the region information includes a physical address, and
   wherein the reclaiming the victim space further comprises:
   reading the physical address included in the region information of the first CLB entry; and
   writing the physical address to a victim space identifier field of the VB location, the victim space identifier field being a field of the VB location that identifies a location in the second cache or the memory to which the data of the victim cache line is to be written-back by the write-back operation.

4. The method of claim 2, wherein the reclaiming the victim space further comprises:
   reading location information for the second cache from the first CLB entry; and
   writing the location information for the second cache to a victim space identifier field of the VB location, the victim space identifier field being a field of the VB location that identifies a location in the second cache or the memory to which the data of the victim cache line is to be written-back by the write-back operation.

5. The method of claim 4, wherein the second cache is at a higher level than the first cache.

6. The method of claim 1,
   wherein the reclaiming of the victim space of the first cache includes storing the data of the new cache line in the victim space before completing the writing, to at least one of the second cache or the memory, of the data of the victim cache line that was copied to the data field of the VB location.

7. The method of claim 6, wherein the performing of the write-back operation on the memory further comprises:
   reading a physical address from a victim space identifier field of the VB location, the victim space identifier field being a field of the VB location that identifies a location in the second cache or the memory to which the data of the victim cache line is to be written-back back by the write-back operation; and
   copying the data of the victim cache line of the data field to a space in the memory corresponding to the physical address.

8. The method of claim 6,
   wherein the computer system further includes a cache location buffer (CLB) that includes one or more CLB entries for storing location information of data of one or more cache lines,
   wherein the performing of the write-back operation on the memory comprises:
   finding an entry in the cache location buffer (CLB) pointed to by the BP of the BP field; and
   changing location information of the entry to point to a space in the memory where the data of the victim cache line is to be stored by the write-back operation.

9. The method of claim 6, wherein the performing of the write-back operation for the second cache comprises:
   reading location information from a victim space identifier field of the VB location, the victim space identifier field being a field of the VB location that identifies a location in the second cache or the memory to which the data of the victim cache line is to be written-back back by the write-back operation; and
   copying the data of the victim cache line of the data field to an entry of the second cache corresponding to the location information.

10. The method of claim 6, further comprising:
freeing up the VB location of the VB when the write-back operation is completed.

11. The method of claim 1,
wherein the VB, first cache and second cache are each set-associative, and
wherein an associativity of the VB is different from an associativity of the first cache and the associativity of the second cache.

12. The method of claim 1,
wherein the computer system further includes a cache location buffer (CLB) that includes one ore more CLB entries for storing location information of data of one or more cache lines,
further comprising:
receiving a request for the victim cache line;
in response to the request for the victim cache line, matching an address included in the request with at least one entry from among the one or more entries in the CLB, the at least one entry being associated with at least one of the first cache or the second cache;
generating level and/or way information based on the matching of the address included in the request; and
reading the data of the victim cache line from the VB using the generated level and/or way information.

13. A multi-processor system comprising:
a memory;
a plurality of nodes, each of the plurality of nodes including at least one processor, a plurality of caches, and a plurality of cache location buffers (CLBs); and
one or more victim buffers (VBs),
wherein,
a processor of an N-th node among the plurality of nodes is configured to
find a VB location from a first VB, from among the one or more VBs, the VB location being a location in the first VB that corresponds to a victim cache line that is to be evicted from a first cache of the plurality of caches of the N-th Node,
copy data of the victim cache line and a backward pointer (BP) associated with the victim cache line to fields of the VB location, and
reclaim victim space of the first cache by storing data of a new cache line in the victim space, the victim space being a location in the first cache where the data of the victim cache line is stored prior to the victim cache line being evicted from the first cache, and
perform a write-back operation by writing, to at least one of the memory or a second cache from among the plurality of caches of the N-th node, the data of the victim cache line that was copied to a data field of the VB location.

14. The system of claim 13,
wherein the plurality of CLBs included in the N-th node includes a first CLB, and the first CLB includes one or more CLB entries for storing location information of data of one or more cache lines,
wherein the processor of the N-th node is further configured to
find, using the BP, a first CLB entry, the first CLB entry being a CLB entry from among the one or more CLB entries of the first CLB that stores location information of the data of the victim cache, and
change the location information of the data of the victim cache line to point to the VB location.

15. The system of claim 14,
wherein the first CLB entry includes region information and the region information includes location information for the second cache,
wherein the second cache is an upper level of the first cache among the caches of the N-th Node, and
wherein the processor of the N-th node is further configured to
read the location information for the second cache from the region information,
write the location information for the second cache in a field of the VB location, and
control the write-back operation such that the data of the victim cache line is written-back to the second cache.

16. The system of claim 14, wherein the processor of the N-th node is further configured to, in response to receiving a request for the victim cache line,
match an address included in the request with at least one entry from among the one or more entries of the first CLB,
generate level and/or way information based on the matching of the address included in the request, and
read the data of the victim cache line using the generated level and/or way information.

17. The system of claim 13, wherein the plurality of nodes are configured to share at least one VB from among the one or more VBs.

18. The system of claim 13, wherein the one or more VBs is a plurality of VBs, and the plurality of VBs are included, respectively, in the plurality of nodes.

19. The system of claim 13, wherein a location information encoding format of the first VB is different from a location information encoding format of the caches.

20. A non-transitory, computer-readable storage medium comprising computer-executable instructions that, when executed by at least one processor, cause the at least one processor to perform operations of a computer system including at least one processor and at least a first cache, a second cache, a victim buffer (VB), and a memory allocated to the at least one processor, the operations including,
selecting, as a victim cache line to be evicted from the first cache, a cache line stored in the first cache,
finding a VB location corresponding to the victim cache line from a first set of the VB, the VB location being a location in the VB, the VB being a set-associative buffer including a plurality of sets, the plurality of sets including the first set,
copying data of the victim cache line to a data field of the VB location,
copying a backward pointer (BP) associated with the victim cache line to a BP field of the VB location,
reclaiming victim space of the first cache by storing data of a new cache line in the victim space, the victim space being a location in the first cache where the data of the victim cache line is stored prior to the victim cache line being evicted from the first cache, and
performing a write-back operation by writing, to at least one of the second cache or the memory, the data of the victim cache line that was copied to the data field of the VB location.

* * * * *